United States Patent [19]

Andrews

[11] 3,913,729
[45] Oct. 21, 1975

[54] BELT ALIGNER
[75] Inventor: Donald E. Andrews, Cambridge, Md.
[73] Assignee: Cambridge Wire Cloth Company, Cambridge, Md.
[22] Filed: Aug. 11, 1972
[21] Appl. No.: 279,783

[52] U.S. Cl. .................................. 198/202; 226/23
[51] Int. Cl.² ......................................... B65G 15/62
[58] Field of Search .......... 198/202; 226/15, 17, 21, 226/23

[56] References Cited
UNITED STATES PATENTS

| | | | |
|---|---|---|---|
| 14,621 | 4/1956 | Wait .............................. | 198/202 X |
| 296,222 | 4/1884 | Schubiger ..................... | 226/23 X |
| 769,850 | 9/1904 | Thompson ..................... | 198/202 |
| 2,132,053 | 10/1938 | Sollenberger et al. .......... | 198/202 |
| 2,869,712 | 1/1959 | Kindig ........................... | 198/202 |

*Primary Examiner*—Evon C. Blunk
*Assistant Examiner*—Douglas D. Watts
*Attorney, Agent, or Firm*—Cushman, Darby & Cushman

[57] ABSTRACT

An improved belt aligner of the type having a main roller over which a continuous belt tracks, sensor rollers respectively contacting the belt edges and mounted for movement together transverse to the direction of belt travel in response to misalignment, and a pivot arm connecting the sensor roller to a member mounting the main roller so that it skews to effect realignment of the tracking belt whereby the pivot arms connecting both sensors to the mounting for the main roller extend parallel to each other and to the belt edge for maintaining the sensor rollers in continuous contact with the belt edges and whereby the main roller is mounted on a plurality of rollers at each end of the main roller for effecting simple and easy pivoting of the main roller about its center.

6 Claims, 6 Drawing Figures

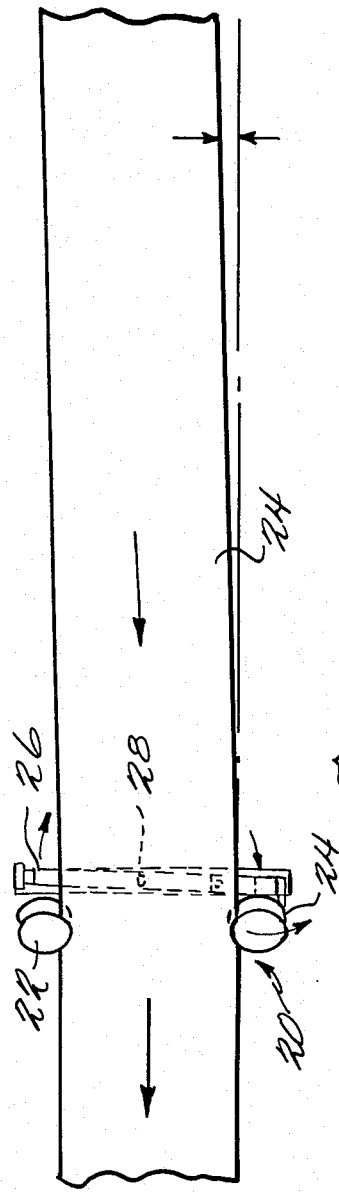
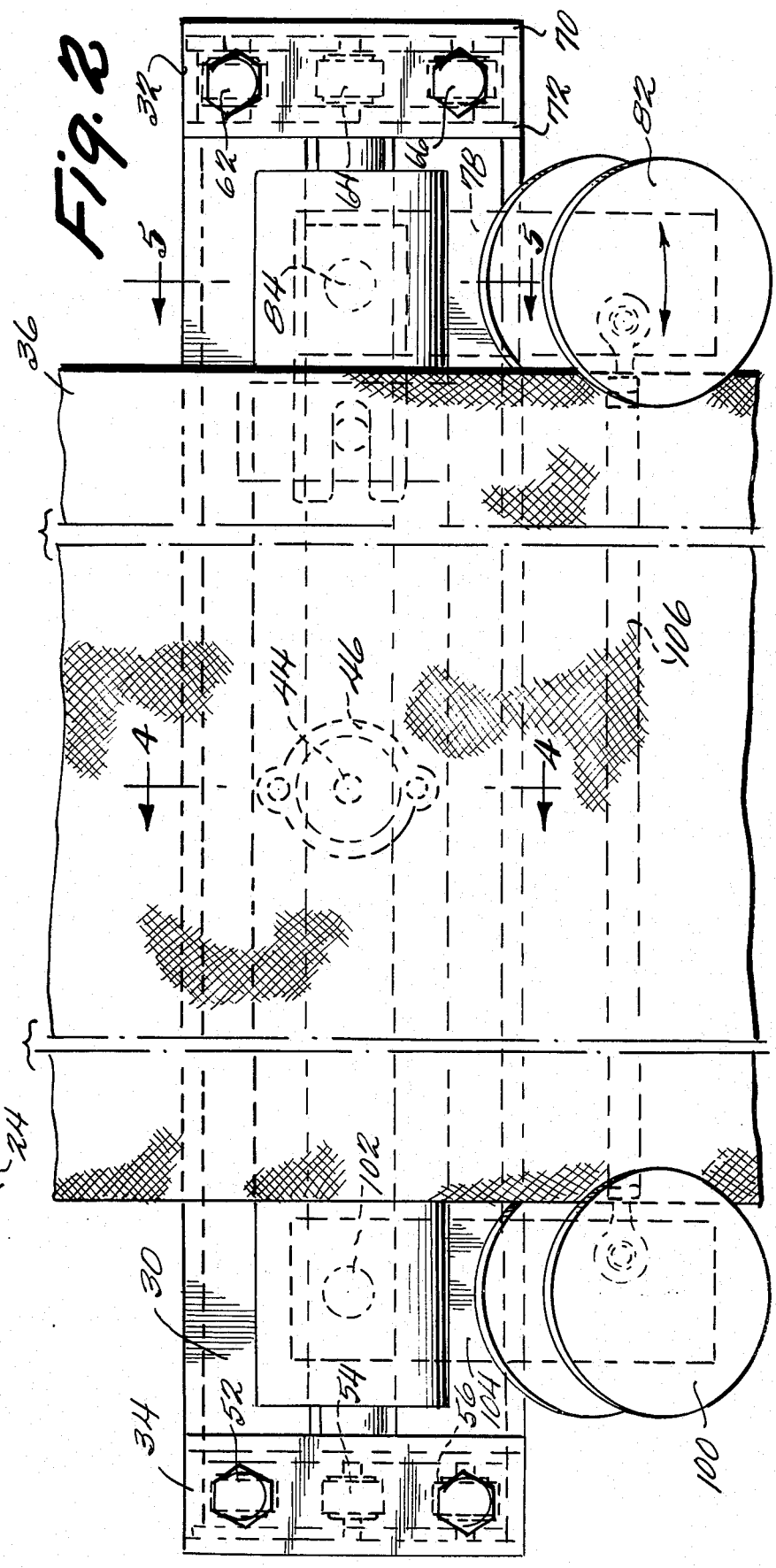

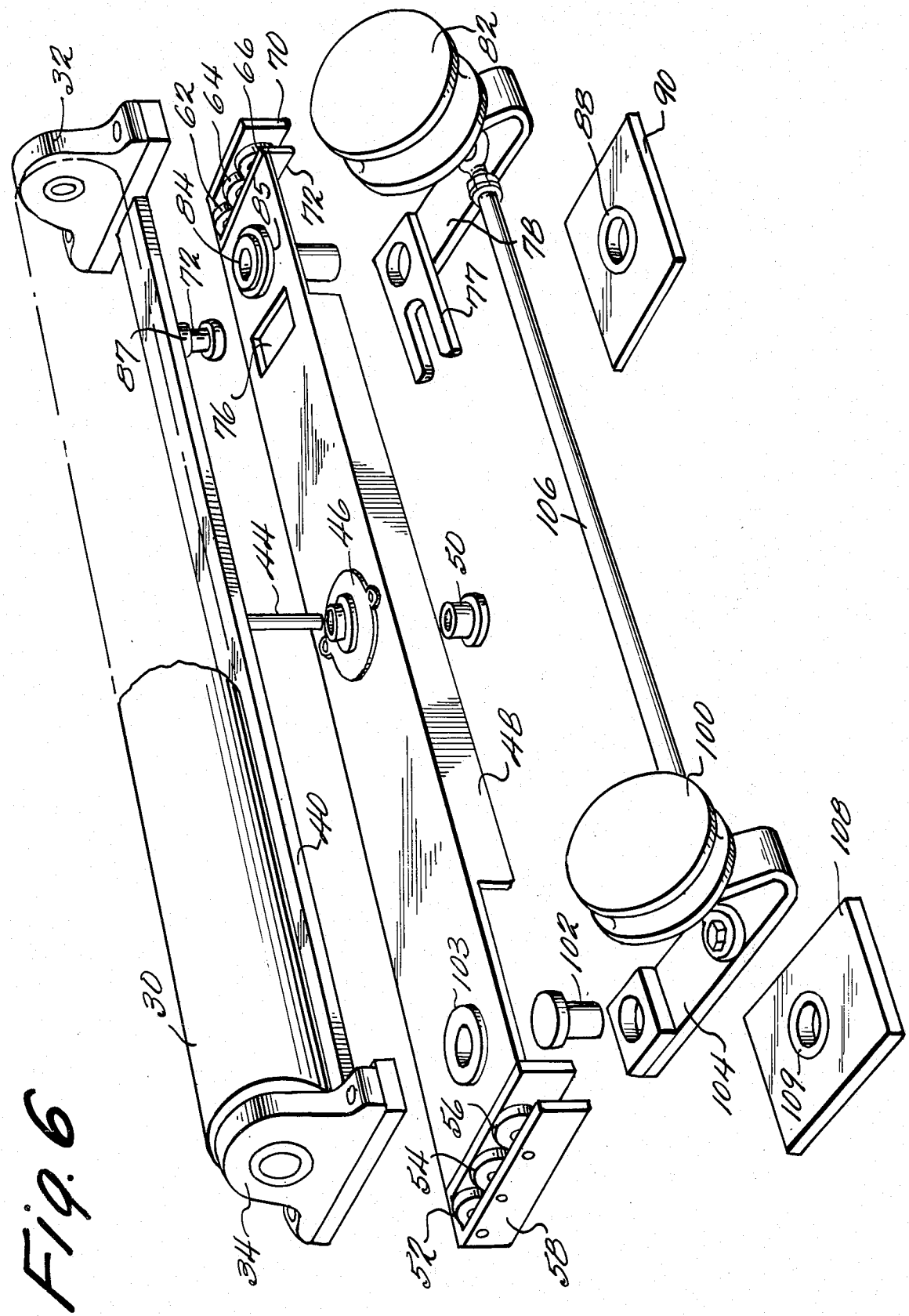

BELT ALIGNER

BRIEF DESCRIPTION OF THE PRIOR ART

Summary of the Invention

The invention relates to an apparatus for aligning an endless belt on a conveyor.

Many belt aligning devices have been developed and are in use for maintaining correct alignment of an endless belt, for example, in a glass annealing lehr or other installation. One type of belt which has been used senses and corrects deviation of the endless belt from its intended path of travel by applying a force to the edge of the belt. U.S. Pat. Nos. 2,533,473 and 2,008,318 illustrate this type of arrangement. One serious problem with this kind of device is that the force applied to the edge of the belt to effect alignment subjects that edge to excessive force causing fatigue and possible belt failure, thus reducing the lifetime of the belt. Since in many applications the expense of the belt may be equal to or greater than the expense of the rest of the conveyor, it is important that the belt lifetime be extended as long as possible.

A second kind of belt aligning device which has been found to be satisfactory in the art employs one or more rollers over which the belt moves, rotating the rollers as it moves along. Sensor rollers are mounted at the edges of the belt and are pivotally connected to the mounting device for a main roller so that as the belt becomes misaligned in one direction or the other, the pivot main roller over which the belt is tracking is skewed by the sensor rollers operating through pivot arms so that it no longer extends with its axis of rotation perpendicular to the direction of travel of the belt. This causes the belt tracking over the roller to move in the opposite direction since the belt always tracks at right angles to the roller, realigning itself automatically so that the main roller is then moved by the sensor rollers operating through pivot arms back to its initial position. The U.S. patents to Jinkins 3,368,665 and Clark 3,187,881 as well as other patents in the prior art describe belt aligners of this general type.

One of the difficulties which has been encountered with belt aligners of this latter type is that the lever arms which connect the sensor rollers to the arrangement for pivoting the main roller do not extend parallel to the edge of the belt nor parallel to each other. One of the results of this construction is that, while the turn buckle or other arrangement which attaches the two lever arms together moves through the same distance transverse to the direction of the travel of the belt as the belt pushes the sensor rollers to one side or the other, the sensor rollers themselves normally do not move through the same transverse distance so that the distance between sensor rollers narrows, exerting excessive force on the belt edges causing fatigue and possible damage. It is desirable to maintain both sensor rollers in continuous contact with the edge of the belt and not to increase the force applied to the edges during realignment.

This difficulty is overcome according to one aspect of the novel invention of this application by attaching the sensor rollers to their point of pivot about the mounting which bears the main roller so that both pivot arms extend parallel to each other and parallel to the edge of the belt. Thus, the transverse movement of each of the sensor rollers is the same and both sensor rollers maintain a firm continuous contact with the edges of the belt.

Another difficulty with belt aligners in the past has been an overcomplexity of structure, and accordingly too high a cost for a belt aligner. For example, the aligner in the Clark U.S Pat. No. 3,187,881 mentioned above employs three rollers which are pivoted together by means of sliding transverse devices mounting the axes of the three main rollers. Another difficulty in belt aligners in the past has been in efficiently and simply effecting pivoting of the main roller about its center while exerting minimum force on the edge of the belt to prolong its life.

According to further aspects of the novel invention of this application as described below, both of these problems are overcome by a simplified structure in which the main roller is mounted on a movable bracket having a pin extending through a fixed bracket near the center of the belt aligner. The movable bracket in the embodiment described below lies on a plurality of small rollers or the like mounted at each end of the device, each having an axis parallel to the axis of the main roller so that as the movable mounting is pivoted by a fork arm attached to the pivot arm, which is in turn attached to the sensor rollers, the movable mounting pivots about its center easily and smoothly providing a simple structure which effectively, reliably and simply effects alignment with a minimum number of parts which can be quickly and simply assembled.

Many other objects and purposes of the invention will become clear from the following detailed description of the drawings.

BRIEF DESCRIPTION OF THE DRAWING

FIG. 1 shows a schematic view of a belt aligner, aligning a belt such as a lehr in a glass making facility.

FIG. 2 shows a top plan view of one embodiment of the invention of this application, broken at two portions in the middle as illustrated.

FIG. 6 shows an exploded perspective view of the belt aligner of this application, illustrating how the components interact together to align a belt.

DETAILED DESCRIPTION OF THE DRAWINGS

Figure 3:
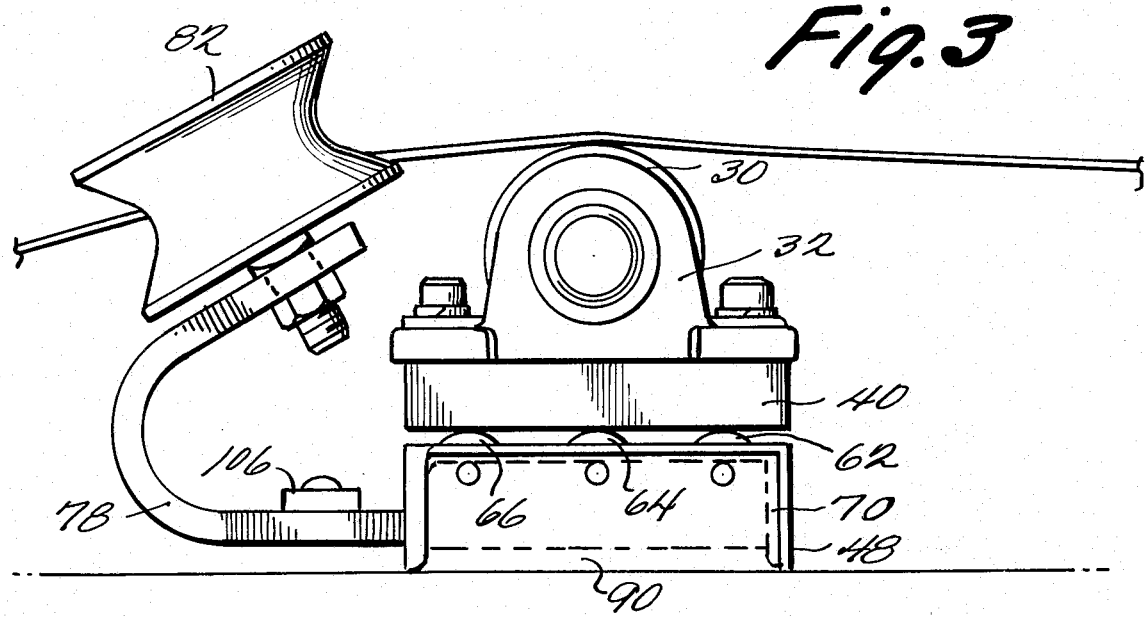
FIG. 3 shows an end view of the embodiment of FIG. 2.

Reference is now made to FIG. 1 which illustrates schematically a belt aligner 20 which includes the two sensor rollers 22 and 24 which contact the edges of a belt 26 after it passes over a conventional main roller 26 which tracks belt 26 in the same manner as in other conventional belt aligners in the prior art. Should the belt become misaligned a force is exerted on either sensor roller 22 or 24 which causes that roller to move in a direction transverse to the direction of movement of belt 24, pivoting about a pivot arm which extends parallel to the edges of belt 24 and parallel to the pivot arm of the other sensor roller and pivoting the mounting on which roller 26 is fixed for rotation about center 28 to cause roller 26 to skew at an angle to the direction of travel of belt 24 so that belt 24 will track back to its initial aligned condition, moving sensors 22 and 24 back to their initial illustrated positions.

Figure 4:
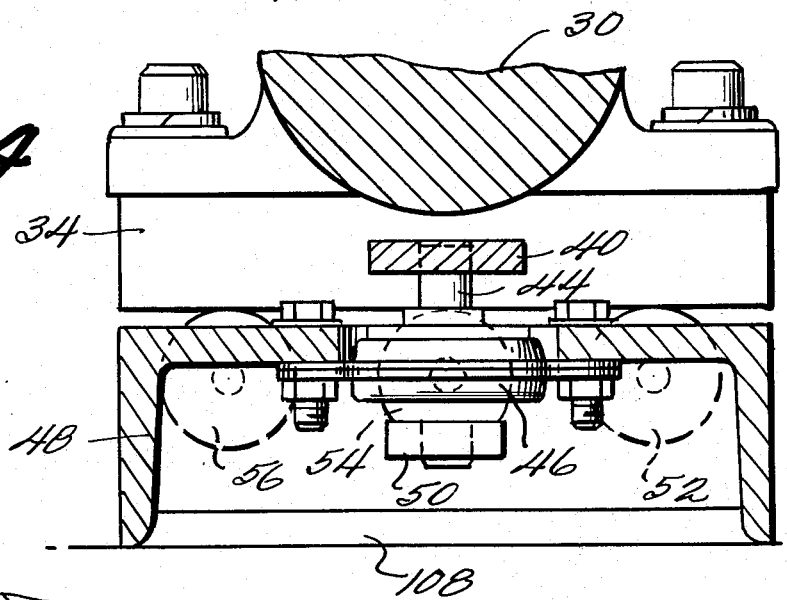
FIG. 4 shows a sectional view through the center of the pivot mount assembly along the line 4—4.
Figure 5:
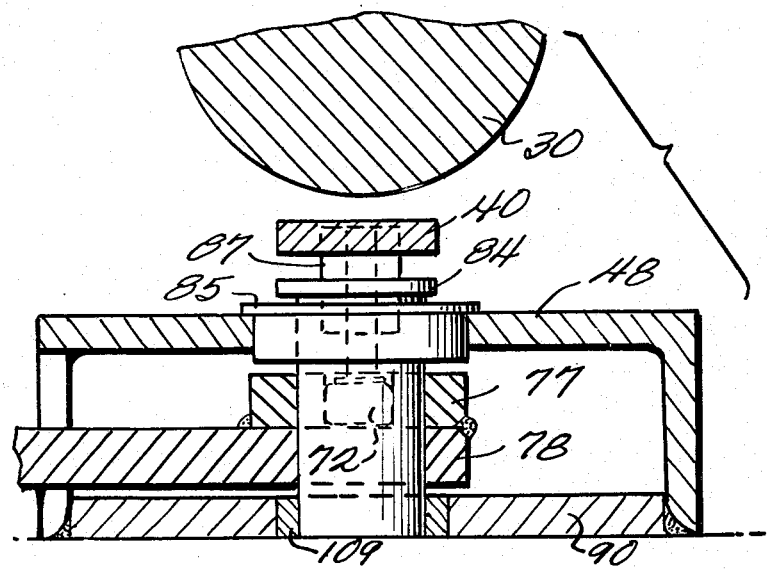
FIG. 5 shows a sectional view through the pivot arm assembly along the line 5—5.

Reference is now made to FIGS. 2–6 which illustrate in detail one embodiment of the novel invention of this application. As shown, main roller 30 is mounted for free rotation between two journaled end members 32 and 34. Roller 30 freely rotates as belt 36 passes over it and, as shown, is preferably chosen to have a length extending beyond the edges of belt 36 for a few inches sufficient to insure that belt 36 will not slide off either end of the roller. End members 32 and 34 are provided with conventional bearings for permitting easy rotation of the main roller 30. Roller 30 may be constructed of any suitable material used in rollers for controlling continuous belts.

End members 32 and 34 are mounted and fixably attached to a base member 40 which is provided in the center thereof with a downwardly extending pin 44 about which base member 40, end members 32 and 34 and roller 30 pivot transverse to the direction of movement of the belt 36 to effect alignment as described below. End members 32 and 34 are preferably bolted to base member 40 as can be seen, for example, in FIGS. 3 and 4. Pivot pin 44 extends through a bearing 46 in a further mounting plate 48 and a member 50 attaches to pin 44 and holds it firmly in place as can be seen in FIG. 6.

As described briefly above, a plurality of pivot rollers are mounted at either end of the belt aligning assembly, engaging end members 32 and 34 respectively for permitting easy pivoting of base member 40 as well as end members 32 and 34 and roller 30 about pin 44 to effect realignment of the belt upon detection of a misalignment. Pivot rollers 52, 54, and 56 are mounted at one end of the belt aligner engaging the lower surface of end member 34 and pivotally mounted between plates 58 and 60 as can be seen in FIG. 6. Similarly, rollers 62, 64, and 66 are provided at the other end of the belt aligner engaging the lower surface of end member 32 and pivotably mounted between plates 70 and 72.

A further pivoting pin 72 is also attached to the under surface of base member 40 in bushing 87 and extends through a slot 76 in member 48 as can be seen best in FIG. 6. Pin 72 engages the inner surface of a fork member 77 which is fixedly attached to support arm 78 on which one of the sensor rollers 82 is mounted. A pivot pin 84 likewise extends through member 48 passing through a hole at the intersection of fork member 77 and pivot member 78 and journaled in a bearing 88 in base plate 90 which can be attached to plates 70 and 72 by any suitable means, for example, welding. Pivot arm 78 and fork member 77 are pivotable about pin 84 when a transverse force is applied by moving belt 36 to sensor roller 82. Sensor roller 100 is likewise pivotable about a pin 102 through an arm 104 with arms 78 and 104 being connected together as shown by a conventional turn buckle assembly 106 so that the two sensor rollers 82 and 100 pivot together about pins 102 and 84. Base plate 108 is likewise mounted and attached to plate 58 for receiving the end of pin 102 in bearing 109 and effecting pivoting of arm 104. There is no need for two fork arms since the two sensor rollers operate together and force exerted on sensor roller 100 pivots arm 78 through turn buckle assembly 106 effecting pivoting of roller 30 in either direction about pin 44.

Arms 104 and 78 preferably mount sensor rollers 82 and 100 at an angle as shown so that the belt 36 coming off roller 30 which normally sags will engage sensor rollers 82 and 100 at roughly the same angle at which they are mounted.

As described it is one of the aspects of this invention that the pivot arm or sensor rollers 82 and 100 are constructed so as to extend parallel to each other and to the edge of the belt so that the transverse movement of sensors 82 and 100 as they pivot about pins 84 and 102 will be the same, and accordingly, both rollers will be maintained in contact with the edges of the belt 36 during aligning and no undesirable gap will open up between the edges of the belt and the sensor rollers.

Also, as described above, rollers 52, 54, 56, 62, 64 and 66 provide a particularly efficient and satisfactory way for providing rotation of the base member 40 which in turn causes pivoting of roller 30 about the pin 44 to effect realignment of the belt 36.

Many changes and modifications to the above described embodiment of the invention can, of course, be made without departing from the scope of the claims. Accordingly, those scopes are intended to be limited only by the scope of the appended claims.

What is claimed is:

1. A belt aligner comprising:

a main roller, means for mounting said main roller so as to permit rotation thereof about a first axis, first and second edge sensor means for contacting opposite edges of a belt respectively, a base member, means pivotably mounting said main roller mounting means on said base member, means pivotably mounting said first and second sensor means on said base member downstream of said roller including sensor pivot means pivotably connecting said first and second sensor means to said base member so as to define a sensor pivot arm which pivots about a vertical axis perpendicular to said first axis for each of said sensor means, each pivot arm extending parallel to the sensor pivot arm of the other sensor means, including an arm member for each sensor means having a sensor means attached at one end and pivotably connected to said base member at the other end so as to define a pivot arm for each sensor means extending parallel to the pivot arm for the other sensor means, a further member rigidly attached to said arm member at one end to extend beneath said main roller mounting means and having a forked portion at the other end, and a downwardly extending pin engaging said forked portion for pivoting said main roller mounting means and said main roller, and pivot means connecting said main roller mounting means to said first and second sensor means for causing said main roller mounting means and main roller to pivot with respect to said base member about a second axis perpendicular to said first axis whenever one of said sensor means is pivoted by a force applied to one of said sensor means by a belt edge including means defining a roller pivot arm extending beneath said main roller mounting means and connected to said sensor pivot means, and means fixed to said main roller mounting means for engaging said pivot arm defining means to pivot said main roller mounting means as said pivot arm defining means is pivoted about said second axis.

2. A belt aligner as in claim 1 wherein said main roller pivotably mounting means includes a plurality of pivot rollers, means for mounting at least one of said pivot rollers at both end of said main roller so that said pivot rollers are free to pivot about an axis parallel to said first axis and wherein said rollers support at least in part the weight of said main roller means and said main roller mounting means and are rotated as said main roller mounting means and main roller are pivoted.

3. A belt aligner as in claim 1 wherein said main roller mounting means includes end members for each receiving an end of said main roller and a support member extending between said end members and having a downwardly extending pin and wherein said base member includes a bearing for receiving said downwardly extending pin and permitting rotation of said main roller mounting means about said downwardly extending pin.

4. A belt aligner as in claim 3 further including a turnbuckle rigidly connecting said arm members together so that said sensor means pivot together.

5. A belt aligner as in claim 3 wherein said sensor means are each a sensor roller having a grooved periphery for receiving a belt edge and wherein each said arm member mounts a sensor roller at an angle to the vertical.

6. A belt aligner as in claim 3 wherein said main roller pivotably mounting means includes a plurality of pivot rollers means for mounting a number of said pivot rollers on said base member at each end of said base member so that said pivot rollers are each freely pivotable about an axis parallel to said first axis and so that said pivot rollers at each end engage the end member at that end so that that end member moves over the pivot rollers at that end as said main roller mounting means is pivoted.

\* \* \* \* \*